Oct. 18, 1927.
M. W. McCONKEY
BRAKE
Filed Dec. 31, 1925
1,646,035
2 Sheets-Sheet 1
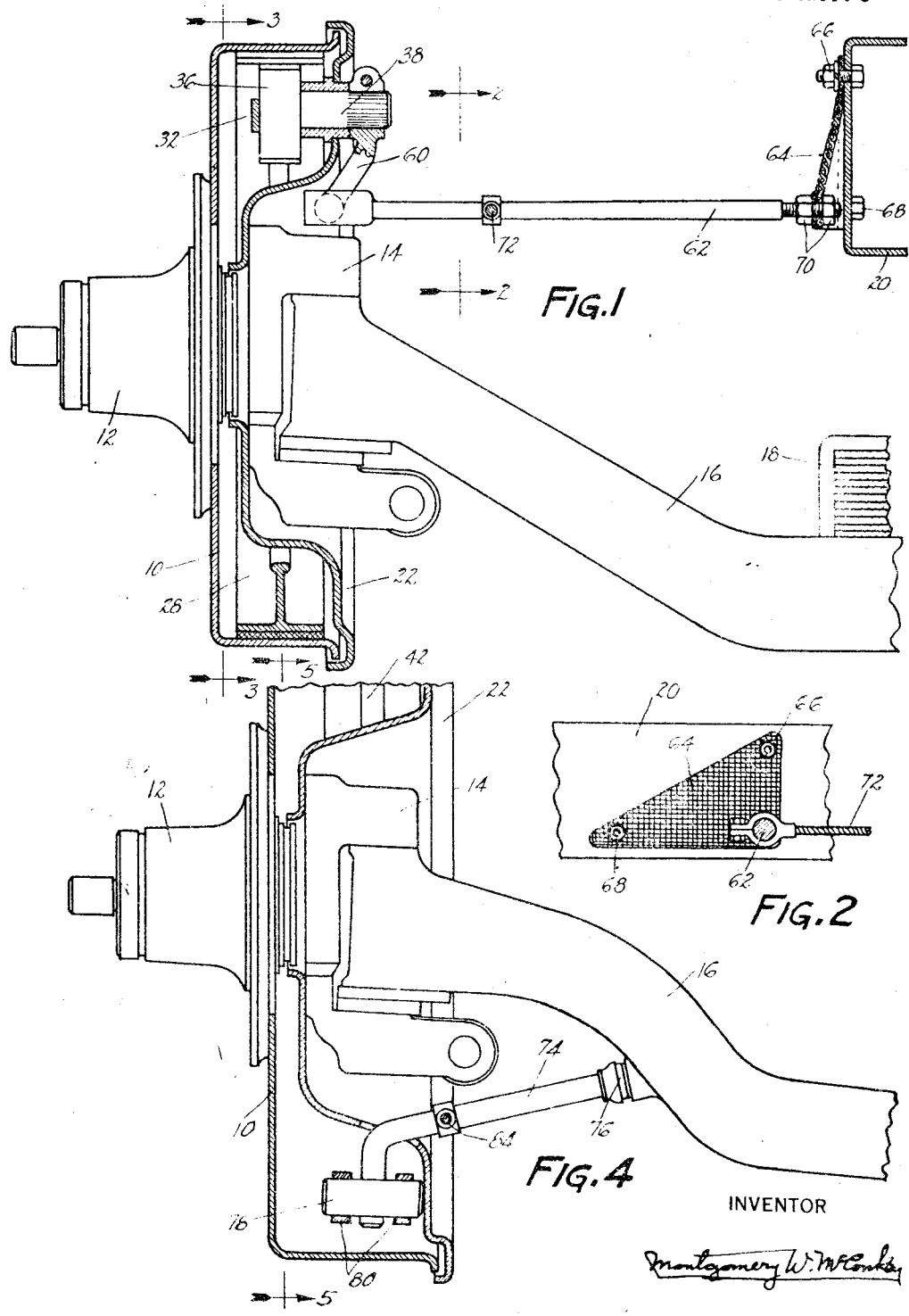
INVENTOR
Montgomery W. McConkey Oct. 18, 1927.
M. W. McCONKEY
1,646,035
BRAKE
Filed Dec. 31, 1925
2 Sheets-Sheet 2
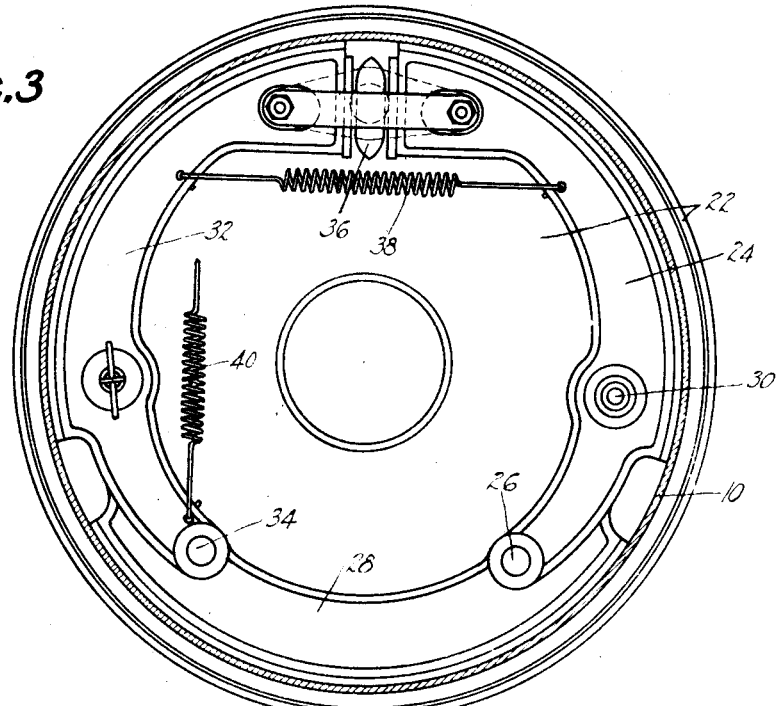
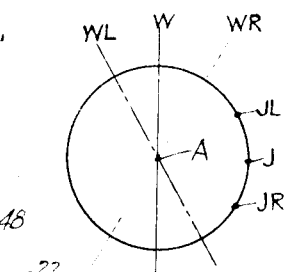
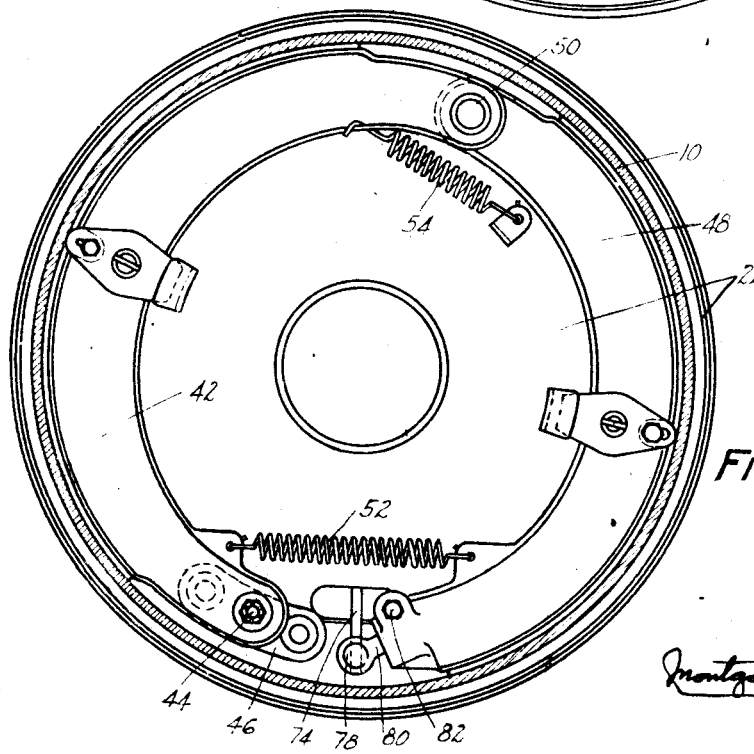
INVENTOR
Montgomery W. McConkey Patented Oct. 18, 1927.

1,646,035

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

BRAKE.

Application filed December 31, 1925. Serial No. 78,553.

This invention relates to brakes, and is illustrated as embodied in mechanism for retarding the motion of a swivelled front automobile wheel. An object of the invention is to provide inexpensive operating mechanism, requiring a minimum of accurate finishing and adjustment, which will afford ample clearance for swivelling the wheel. Having this object in view, the mechanism includes as an essential element a lever fulcrumed at its inner end, the lever preferably being operated by means engaging it between its ends, the connection with such means thus being displaced inwardly from the wheel far enough to give ample clearance for the wheel in swivelling.

In one desirable arrangement, where the lever is jointed or otherwise arranged to act directly on the friction member of the brake, the inner end of the lever is fulcrumed on the axle. In an arrangement preferred for double-acting brakes, having brake-applying means above the axle, the lever is fulcrumed at its inner end on the chassis frame, preferably by a connection including a fabric or other flexible support which compensates for movement of the lever and for movement of the vehicle springs.

In both arrangements, I prefer that the joint or equivalent at the outer end of the lever should move in applying the brake perpendicular to the swivelling axis of the wheel from an idle position spaced materially from the axis to an active position in or immediately adjacent the axis.

An important minor feature of the invention relates to arranging a brake control of this type so that the pressure on the brake is varied in rounding a corner, to guard against skidding, preferably by relieving the pressure on the brake when the wheel is on the outside of the turn.

The above and other objects and features of the invention, including various novel combinations of parts and desirable particular constructions, will be apparent from the following description of two illustrative embodiments shown in the accompanying drawings, in which:

Fig. 1 is a vertical section transversely through one front brake and associated parts, showing the lever in rear elevation;

Fig. 2 is a vertical section on the line 2—2 of Fig. 1, showing in side elevation the flexible support on the chassis frame for the end of the lever;

Fig. 3 is a vertical section through the brake only, on the line 3—3 of Fig. 1, showing the shoes in side elevation;

Fig. 4 is a vertical section corresponding to Fig. 1, but showing a different brake and control;

Fig. 5 is a vertical section on the line 5—5 through the brake of Fig. 4, showing the shoes in side elevation and corresponding to Fig. 3; and Fig. 6 is a diagram, corresponding to a top plan view, illustrating the relief in pressure on the outer brake on a turn.

Each of the brakes includes a drum 10 rotating with a wheel, the hub of which is shown at 12. The wheel is rotatably mounted on the spindle of a knuckle 14, swivelled at the end of a front axle 16. Axle 16, with a rear axle (not shown) supports through springs 18 a chassis frame 20. Drum 10 is closed at its open side by any suitable backing plate 22.

The brake of Figs. 1, 2, and 3 includes a reverse shoe 24 anchored at 26 on the backing plate 22, a central shoe 28 anchored at 30, and a servo shoe 32 pivotally connected at 34 to shoe 28. Shoes 24 and 32 are forked or otherwise formed at their ends to straddle or overlap the opposite ends of shoe 28. Anchor 26 passes through a relatively large opening in the web of shoe 28, and anchor 30 passes through relatively large openings in the arms forming the forked end of shoe 24. The brake is applied by a double cam 36 on a shaft 38, against the resistance of a return spring 38. An auxiliary spring 40 insures that shoe 32 will engage the drum first, then turning with the drum to apply shoe 28, thus giving a smooth and gradual application of the brake.

The brake of Figs. 4 and 5 includes a first shoe 42 anchored at 44 on a bracket 46 riveted to the backing plate 22, and a servo shoe 48 pivotally connected to shoe 42 at 50. A return spring 52 holds the shoes away from the drum, and an auxiliary spring 54 insures that shoe 48 will engage the drum first, turning with the drum to apply shoe 42.

Except as further described below, the above-identified parts or their equivalents may be of any desired construction. According to the present invention, the brakes, whether or not constructed as described above, are applied by novel mechanism shown mostly in Figs. 1 and 4.

In the arrangement of Fig. 1, an arm 60 adjustably mounted on the end of the camshaft 38, terminates in a ball received in a socket formed in the outer end of a horizontal lever 62 supported and fulcrumed on the chassis frame at its inner end by means illustrated as a heavy fabric 64 of the type used for spring shackle substitutes, etc.

Fabric 64 is shown secured to frame 20 by a fastening 66 above the lever, to take the weight, and by a fastening 68 ahead of the lever, which takes the pull on the fulcrum. The fabric is shown triangular in shape, with shaft 62 secured by nuts 70 at its free corner, so that the fabric may flex to compensate for movements of the lever and for movements due to springs 18. The lever 62 is operated by a brake rod or cable 72 or the like, connected between its ends.

In the arrangement of Fig. 4, the inner end of lever 74 is fulcrumed by any suitable joint 76 on the bottom of axle 16, while its outer end is turned vertically and projected downwardly through a cylindrical connector 78. Connector 78 is held by arms forming the forked end of a thrust member 80 threaded into the split end of shoe 48 and clamped in adjusted position by a contracting and clamping screw 82. Lever 74 is operated by a rod or cable 84 or the like, attached between its ends.

In the arrangement of Fig. 1, arm 60 and lever 62 are connected by a universal joint of the ball and socket type. In Fig. 4, connector 78, pivoted on the end of lever 74 and able to turn in the arms at the end of thrust member 80, also forms a universal joint. In each case, the joint at the outer end of the lever moves in applying the brake perpendicular to the swivelling axis of the wheel from an idle position spaced materially from that axis to an active position in or immediately adjacent that axis.

When it is desired that the pressure on the outer brake be relieved on a turn, the active position of the center of the joint is not exactly in the swivelling axis of the wheel, but is spaced a small fraction of an inch from that axis on the side opposite the wheel. This arrangement is illustrated on an exaggerated scale in the diagram of Fig. 6.

In Fig. 6, which corresponds to a top plan view, "W" is a line through the swivelling axis "A" parallel to the wheel when the vehicle is moving straight ahead, and "WR" and "WL" are respectively parallel to the wheel when swivelled to the right (on the outside of the turn) and to the left (inside of the turn). The front of the car is toward the top, and the wheel is the left front wheel, in this diagram. The normal position of the center of the joint, with the brake applied and the wheel parallel to the line "W", is at "J". When the wheel is parallel to "WR", the joint is swung to "JR", in a direction relieving the tension on member 72 or 84, and therefore relieving the pressure on the brake. When the wheel is swivelled parallel to "WL", the joint is swung to "JL", slightly increasing the pressure on the brake.

While two illustrative embodiments have been described in detail, it is not my intention to limit the scope of the invention to those particular embodiments, or otherwise than by the terms of the appended claims.

I claim:

1. A swivelled wheel having a brake and operating mechanism for the brake comprising, in combination, a lever fulcrumed at its inner end and having a brake-applying portion at its outer end movable from an idle position spaced materially from the swivelling axis of the wheel toward that axis, and brake-applying means engaging the lever between its ends.

2. A swivelled wheel having a brake and operating mechanism for the brake comprising, in combination, a lever fulcrumed at its inner end and having a brake-applying portion at its outer end movable substantially perpendicular to the swivelling axis of the wheel to its active position and brake-applying means engaging the lever between its ends.

3. A swivelled wheel having a brake and operating mechanism for the brake comprising, in combination, a lever fulcrumed at its inner end, a brake-applying joint at the outer end of the lever arranged adjacent the swivelling axis of the wheel at least when the brake is applied, and brake-applying means operatively engaging the lever between its ends.

4. A swivelled wheel having a brake, a chassis frame, and operating mechanism for the brake comprising, in combination, a lever flexibly supported and fulcrumed at its inner end on the chassis frame, a brake-applying portion at the outer end of the lever arranged adjacent the swivelling axis of the wheel at least when the brake is applied, and brake-applying means operatively engaging the lever between its ends.

5. A vehicle having a chassis frame and a swivelled wheel with a brake, and comprising, in combination therewith, a brake-applying device swivelling with the wheel, a lever jointed to said device at its outer end and movably supported and fulcrumed on the chassis frame at its inner end and restrained from rotation about its longitudinal axis, and brake-applying means operatively engaging the lever between its ends.

6. A vehicle having a chassis frame and a swivelled wheel with a brake, and comprising, in combination therewith, a generally vertical brake-applying arm swivelling with the wheel, a generally horizontal lever jointed to said device at its outer end and movably supported and fulcrumed on the chassis frame at its inner end in a manner permitting it to move lengthwise, and brake-applying means operatively engaging the lever between its ends.

7. A vehicle having a chassis frame and a swivelled wheel with a brake, and comprising, in combination therewith, a brake-applying device swivelling with the wheel, a horizontal lever jointed to said device at its outer end, a flexible part secured to the chassis frame and supporting the inner end of the lever and serving as a fulcrum for the lever, and brake-applying means operatively engaging the lever between its ends.

8. A vehicle having a chassis frame and a swivelled wheel with a brake, and comprising, in combination therewith, a brake-applying device swivelling with the wheel, a lever jointed to said device at its outer end, and movable about its inner end in a generally horizontal plane, a piece of fabric secured to the chassis frame and supporting the inner end of the lever and serving as a fulcrum for the lever, and brake-applying means operatively engaging the lever between its ends.

9. A vehicle having a swivelled wheel with a brake, and comprising, in combination therewith, a brake-operating arm swivelling with the wheel and having its end movable from an idle position spaced from the swivelling axis of the wheel toward that axis, a lever fulcrumed at its inner end and universally jointed at its outer end to said end of the brake-operating arm, and brake-applying means operatively engaging said lever between its ends.

10. A vehicle having a swivelled wheel with a brake, and a chassis frame, and comprising, in combination therewith, a generally vertical brake-operating arm swivelling with the wheel and having its end movable from an idle position spaced from the swivelling axis of the wheel toward that axis, a generally horizontal lever fulcrumed at its inner end on the chassis frame and universally jointed at its outer end to said end of the brake-operating arm, and brake-applying means operatively engaging said lever between its ends.

11. A vehicle having a swivelled wheel with a brake, and comprising, in combination therewith, a brake-applying part swivelling with the wheel, and a lever operatively engaging said part and moving it in applying the brake from a position spaced materially forward of the swivelling axis to an active position immediately adjacent that axis such that swivelling the wheel to place it on the outer side of a turn tends to swing said part away from the lever to relieve the pressure on the brake.

12. A vehicle having a swivelled wheel with a brake, and comprising, in combination therewith, a brake-applying part swivelling with the wheel, and a lever operatively engaging said part and moving it in applying the brake from a position spaced materially forward of the swivelling axis to an active position on the opposite side of that axis from the wheel such that swivelling the wheel to place it on the outer side of a turn tends to swing said part away from the lever to relieve the pressure on the brake.

13. A vehicle having a swivelled wheel with a brake, and comprising, in combination therewith, a brake-applying part swivelling with the wheel, and a lever operatively engaging said part and moving it in applying the brake from an idle position spaced materially forward of the swivelling axis of the wheel rearwardly to an active position adjacent that axis such that swivelling the wheel varies the pressure on the brake.

14. A vehicle having a swivelled wheel with a brake, and comprising, in combination therewith, a brake-applying part swivelling with the wheel, a lever fulcrumed at its inner end and operatively engaging said part at its outer end and moving it in applying the brake from an idle position spaced materially forward of the swivelling axis of the wheel rearwardly to an active position adjacent that axis such that swivelling the wheel varies the pressure on the brake, and brake-applying means engaging said lever between its ends.

In testimony whereof, I have hereunto signed my name.

MONTGOMERY W. McCONKEY.